(12) United States Patent
Skagius et al.

(10) Patent No.: US 11,302,209 B2
(45) Date of Patent: Apr. 12, 2022

(54) VEHICLE DRIVER FEEDBACK SYSTEM AND CORRESPONDING METHOD

(71) Applicant: VOLVO TRUCK CORPORATION, Gothenburg (SE)

(72) Inventors: Adam Skagius, Linköping (SE); Fredrik Löwgren, Rönninge (SE); Anders Eriksson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 416 days.

(21) Appl. No.: 15/113,819

(22) PCT Filed: Jan. 28, 2014

(86) PCT No.: PCT/EP2014/000222
§ 371 (c)(1),
(2) Date: Jul. 23, 2016

(87) PCT Pub. No.: WO2015/113573
PCT Pub. Date: Aug. 6, 2015

(65) Prior Publication Data
US 2017/0110021 A1    Apr. 20, 2017

(51) Int. Cl.
*B60W 50/14*    (2020.01)
*G09B 9/042*    (2006.01)
(Continued)

(52) U.S. Cl.
CPC ............... *G09B 9/042* (2013.01); *B60K 35/00* (2013.01); *B60W 50/14* (2013.01); *G07C 5/06* (2013.01);
(Continued)

(58) Field of Classification Search
CPC . G09B 9/02; G09B 9/042; G09B 9/05; G09B 9/052
See application file for complete search history.

(56) References Cited

U.S. PATENT DOCUMENTS

2009/0312945 A1*  12/2009  Sakamoto .......... G01C 21/3697
                                                                701/532
2010/0030413 A1    2/2010  Jinno
(Continued)

FOREIGN PATENT DOCUMENTS

CA         2735458 A1      9/2012
DE    102010054077 A1      6/2012
(Continued)

OTHER PUBLICATIONS

Japanese Official Action (dated May 15, 2018) for corresponding Japanese App. 2016-548672.
(Continued)

*Primary Examiner* — Bruk A Gebremichael
(74) *Attorney, Agent, or Firm* — VenableLLP; Jeffri A. Kaminski

(57) ABSTRACT

A vehicle driver feedback system includes a control unit and a display unit. The control unit is arranged for registering a driver-influenced vehicle driving parameter and the display unit is positioned in the vehicle and arranged for displaying information to the vehicle driver. The control unit further is arranged for: iteratively calculating and storing at least one score value based on the at least one driver-influenced vehicle driving parameter, wherein the at least one score value reflects a magnitude of driver-induced energy waste; driver-induced fuel waste; driver-induced vehicle wear; unsafe driving; or a weighted combination of at least two thereof, and displaying on the display unit during driving of the vehicle a graphical score value development over time or relative to the travelled route as feedback to the vehicle driver.

26 Claims, 4 Drawing Sheets

(51) Int. Cl.
  *B60K 35/00* (2006.01)
  *G07C 5/06* (2006.01)
  *G09B 5/02* (2006.01)
(52) U.S. Cl.
  CPC .......... *G09B 5/02* (2013.01); *B60K 2370/174* (2019.05); *B60W 2520/10* (2013.01); *B60W 2520/105* (2013.01); *B60W 2520/125* (2013.01); *B60W 2540/12* (2013.01); *B60W 2554/801* (2020.02); *B60W 2556/10* (2020.02); *B60W 2556/50* (2020.02); *B60W 2556/65* (2020.02); *Y02T 10/84* (2013.01)

(56) References Cited

U.S. PATENT DOCUMENTS

| | | | | |
|---|---|---|---|---|
| 2010/0063725 | A1* | 3/2010 | Miura | G01C 21/26 701/408 |
| 2011/0251752 | A1* | 10/2011 | DeLarocheliere | G07C 5/008 701/31.4 |
| 2012/0053805 | A1* | 3/2012 | Dantu | B60W 40/09 701/70 |
| 2012/0179346 | A1 | 7/2012 | Aldighieri et al. | |
| 2012/0202176 | A1* | 8/2012 | Dick | B60W 40/09 434/65 |
| 2013/0164714 | A1* | 6/2013 | Hunt | G09B 19/167 434/65 |
| 2014/0088858 | A1* | 3/2014 | Stefan | B60K 35/00 701/123 |

FOREIGN PATENT DOCUMENTS

| | | |
|---|---|---|
| DE | 102012004432 A1 | 3/2013 |
| EP | 2375385 A1 | 10/2011 |
| JP | 2002260146 A | 9/2002 |
| JP | 2006227141 A | 8/2006 |
| JP | 2008501573 A | 1/2008 |
| JP | 2009126246 A | 6/2009 |
| JP | 2009181289 A | 8/2009 |
| JP | 2010271749 A | 12/2010 |
| JP | 2014132253 A | 7/2014 |
| WO | 2004108466 A1 | 12/2004 |
| WO | 2006001809 A1 | 1/2006 |
| WO | 2008036014 A1 | 3/2008 |
| WO | 2008127465 A1 | 10/2008 |

OTHER PUBLICATIONS

International Search Report (dated Sep. 30, 2014) for corresponding International App. PCT/EP2014/000222.
International Preliminary Report on Patentability dated May 3, 2016) for corresponding International App. PCT/EP2014/000222.
Japanese Official Action (dated Dec. 21, 2017) for corresponding Japanese App. 2016-548672.
European Official Action (dated Jan. 17, 2019) for corresponding European App. 18 192 878,9.

* cited by examiner

VEHICLE DRIVER FEEDBACK SYSTEM AND CORRESPONDING METHOD

BACKGROUND AND SUMMARY

The invention relates to vehicle driver feedback system comprising a control unit and a display unit, the control unit being arranged for registering a driver-influenced vehicle driving parameter, and the display unit being positioned in the vehicle and arranged for displaying information to the vehicle driver. The invention further relates to a corresponding method for providing vehicle driver feedback comprising. The invention can preferably be applied in heavy and medium goods vehicles, trucks, buses and construction equipment, automobiles, or the like.

The fuel cost is expected to rise and engine development has reached a level where further improvements in fuel economy generally are very costly to attain. The driver's ability to improve fuel economy is however still not particularly developed. With small aids a driver can reduce the total amount of fuel used simply by driving the vehicle in a more fuel efficient way. The common solution to this problem is driver training during courses or some judging system that tells the driver what behaviour is good. However, the effect of the driver courses normally do not last long and the driver may fall back to the old habits. US 2007/0001831 A1 shows a system where the driver is provided with feedback on a display. The display is intended for mounting in the vehicle being driven and display a rating of the driver's driving in real time, for example using multiple indicator lights. There is however room for improvement of the vehicle driver feedback system and method.

It is desirable to provide a vehicle driver feedback system and method for providing vehicle driver feedback that provides improved feedback information to the driver of the vehicle.

According to a first aspect of the invention, a vehicle driver feedback system comprises a control unit and a display unit, the control unit being arranged for registering a driver-influenced vehicle driving parameter, and the display unit being positioned in the vehicle and arranged for displaying information to the vehicle driver.

The invention is characterised, according to an aspect thereof, in that the control unit is arranged for:

iteratively calculating and storing at least one score value SE, SF, SW, SU based on the at least one driver-influenced vehicle driving parameter, wherein the at least one score value SE, SF, SW, SU reflects a magnitude of driver-induced energy waste; driver-induced fuel waste; driver-induced vehicle wear; unsafe driving; or a weighted combination of at least two thereof, and displaying on the display unit during driving of the vehicle a graphical score value development over time or relative to the travelled route as feedback to the vehicle driver.

According to a second aspect of the invention, a method for providing vehicle driver feedback comprising registering using a control unit a driver-influenced vehicle driving parameter;

iteratively calculating and storing using the control unit at least one score value SE, SF, SW, SU based on the at least one driver-influenced vehicle driving parameter, wherein the at least one score value SE, SF, SW, SU reflects a magnitude of driver-induced energy waste; driver-induced fuel waste; driver-induced vehicle wear; unsafe driving; or a weighted combination of at least two thereof, and displaying to the vehicle driver during driving a graphical score value development over time or relative to the travelled route as feedback to the vehicle driver.

By the provision of the vehicle driver feedback system and method for providing vehicle driver feedback as defined above, the driver is provided with iterative training to enhance the ability to drive in a more fuel efficient way. The feedback is preferably located as close to the actions as possible to get a more immediate feedback of the driver actions. The magnitude of the driver actions impact is also displayed to provide a more valuable and useful feedback information. Furthermore, by displaying to the vehicle driver during driving a graphical score value development over time or relative to the travelled route as feedback to the vehicle driver, the driver is not required to continuously monitor the display to acquire useful feedback. Instead, the information is displayed on the display for a longer time period, such that driver can receive feedback quickly and easily by briefly looking at the display during or relatively shortly after a certain event to acquire a comprehensible understanding of the consequences of his/her acts.

If the driver is not familiar to the road the possibility to anticipate upcoming situations will be limited. However, by informing the driver about upcoming situations and when necessary actions are needed to take place, the score value development can be greatly improved in roads unfamiliar to the driver. The system and method according to the invention can thus be significantly improved by integrating also a positioning system, i.e. a GPS system, for guiding the driver towards a driving style that results in a more positive score value.

Further advantages and advantageous features of the invention are disclosed in the following description and in the dependent claims. For example, a delay time between a driver action influencing the score value and display of a result of that driver action may be less than 5 minutes, preferably less than 60 seconds, and more preferably less than 10 seconds. The faster the feedback of driver actions are displayed on the display the better will the driver understand the underlying reason behind the displayed score value development. A substantially immediate feedback is generally preferable. However, applications having a relative low display update frequency may exhibit a certain delay time.

The registered driver-influenced vehicle driving parameter is at least one of vehicle longitudinal or lateral acceleration; vehicle braking; vehicle overspeeding; combustion engine idling time; manual shifting pattern; or distance to vehicle in front. There are many solutions available for detecting, acquiring and registering the defined vehicle driving parameters. For example, the longitudinal and lateral acceleration may be registered by reading the output signal of one or more accelerometer sensors. Alternatively, the longitudinal acceleration may be calculated based on determined current vehicle speed change rate and the lateral acceleration may be calculated based on current vehicle speed and current vehicle steering angle. Vehicle braking may be determined based on the registered longitudinal acceleration or by detecting current braking level, for example based on detected pressure in the hydraulic braking system, the force actuated on the brake actuator by the driver, the level of engine braking and/or retarder braking that is currently use. When determining a score value reflecting the current driver-induced vehicle wear the use of friction brakes may be taken into account while engine braking and/or retarder braking is omitted from the calculation because they to do incur any reasonable wear. Vehicle overspeeding as vehicle driving parameter may be calculated by comparing actual vehicle driving speed and current speed limit. The score value reflecting driver-induced energy waste, driver-induced fuel waste or unsafe driving may be calculated by subtracting, from current vehicle speed, the current speed limit and a possibly also certain threshold value that can be fixed or dynamically variable.

Combustion engine idling time as vehicle driving parameter may be calculated by the time period in which the engine is idling and the vehicle is still standing. Possibly, a certain initial time period, such as about 0-10 seconds, may be deducted to avoid that also relatively short idling times are included in the score value reflecting the engine idling time. Engine idling time that is required to power an auxiliary load, such as a refrigerator unit or hydraulically operated lifting equipment or the like, may be deducted when determining the score value reflecting driver-induced energy waste or driver-induced fuel waste. Manual shifting pattern as vehicle driving parameter may be calculated by comparing the shifting pattern selected by the driver with the shifting pattern that would have used by the automatic transmission controller for a corresponding driving situation. Distance to vehicle in front as vehicle driving parameter may be calculated using a distance measurement sensor, such as radar, laser or the like, or by inter vehicle communication between front and rear vehicle in combination with an accurate information of the vehicle position at each time point.

The score value SE, SF, when reflecting driver-induced energy waste or driver-induced fuel waste, may reflect the sum of one or more of waste of kinetic energy caused by vehicle braking, energy waste caused by increased vehicle drag resulting from driving faster than a speed threshold value, fuel waste during engine idling time, or decreased level of engine effectiveness at current engine operating state compared with a level of engine effectiveness at a more optimal engine operating state available for the present vehicle operating condition. These vehicle driving parameters are preferred examples of parameters that are considered relevant for determining the level of energy or fuel waste.

The score value SE, SF, SW, SU as positive feedback to the vehicle driver additionally reflects a magnitude of driver-induced saved energy, driver-induced saved fuel, driver-induced low vehicle wear, or safe driving.

The score value SE, SF, when reflecting driver-induced saved energy or driver-induced saved fuel, reflects saved energy or saved fuel by letting the vehicle roll, or saved energy or saved fuel by increasing vehicle speed before climbing a hill. These vehicle driving parameters are preferred examples of parameters that are considered relevant for determining the level of saved energy.

The score value SW, when reflecting driver-induced vehicle wear, reflects the sum of one or more of the level of lateral acceleration above a threshold value, the level of longitudinal acceleration deceleration above a threshold value, or the level of wear of the vehicle friction brakes. These vehicle driving parameters are preferred examples of parameters that are considered relevant for determining the level of vehicle wear.

The score value SU, when reflecting unsafe driving, reflects the sum of one or more of the level of lateral acceleration above a threshold value, the rate of change of longitudinal deceleration above a threshold value, the level of vehicle speed above the current vehicle speed limitation, the level of acceleration above a threshold value in residential areas, urban areas or in areas with low vehicle speed limitation, or the distance to the vehicle in front below a threshold value. These vehicle driving parameters are preferred examples of parameters that are considered relevant for determining the level of unsafe driving.

The at least one score value SE, SF, SW, SU is calculated taking into account also the current vehicle load level. Thereby, the score value may be calculated to be independent on the load level. This has the advantage that the score value is more comparable with previous and later score values for the same driving path, by the same or other drivers.

The system may be arranged for calculating an accumulated score value SE, SF, SW, SU over a certain time period, and/or calculating an average score value SE, SF, SW, SU by dividing an accumulated score value with a certain distance. Averaging the score value over time or over distance enables display of a smoother and more comprehensible graphical representation of the score value.

The system may be arranged for evaluating a driving performance of a vehicle driver by comparing the accumulated score value SE, SF, SW, SU and/or average score value SE, SF, SW, SU with the result from other vehicle drivers and/or historical result from the same driver. Thereby the best driver may be identified, other drivers may learn from the best driver and/or be triggered to improve their driving style, and any driver may compete against its own high score.

The displayed time period of the score value development over time may lie in the range of 0.1-60 minutes, preferably 0.2-10 minutes, and more preferably 0.5-5 minutes. Increased time period enables overview over a longer time period but with proportionally reduced resolution, such that the near past driving feedback is increasing difficult to interpret. Reduced time period enables improved resolution but there is an increased risk that the driver, after having passed a driver demanding time period that requested the driver's full concentration, cannot view the relevant driving feedback corresponding to the driver demanding road section because the displayed time period does not extend so far into the past to fully cover the driver demanding road section.

The score value development relative to the travelled route is displayed for a route length in the range of 0.1-80 kilometers, preferably 0.5-15 kilometers, and more preferably 1-5 kilometers. The same reasoning with resolution and content as described in the previous passage applies also here.

The graphical score value development over time or relative to the travelled route may be displayed as a continuous graph, discrete graph, histogram, bar chart, pie chart or scatter plot. The graphical display method may be selected according to the specific needs of the application. For road vehicles, a continuous graph is preferred.

The score value may be calculated and displayed substantially in real-time, such that the vehicle driver get access to substantially instant feedback of how driver actions influence the score value. Immediate feedback enables the driver to better associate a displayed feedback with a specific driving occurrence, such that improved learning is enabled.

The invention also concerns, according to an aspect thereof, a vehicle comprising a vehicle driver feedback system according to the preceding disclosure.

The invention also concerns, according to an aspect thereof, method steps for providing vehicle driver feedback according to the preceding disclosure.

The invention also concerns, according to an aspect thereof, a computer program comprising program code means for performing the disclosed method when said program is run on a computer.

The invention also concerns, according to an aspect thereof, a computer readable medium carrying a computer program comprising program code means for performing the method according to the preceding disclosure when said program product is run on a computer.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
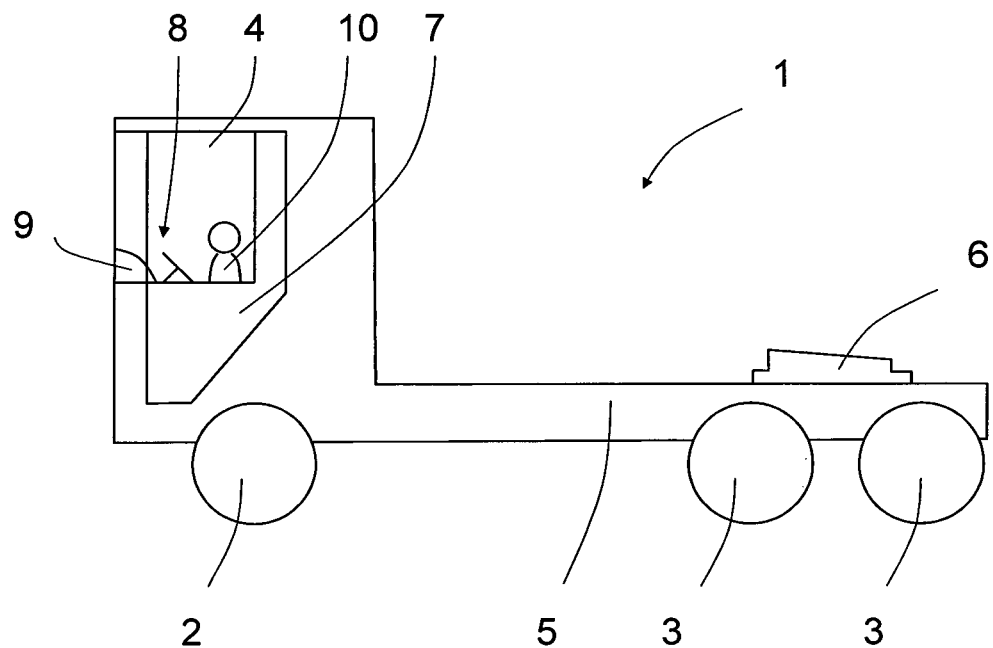
FIG. 1 shows a truck suitable for having the feedback system.

FIG. 1 shows a vehicle 1 in form of a heavy truck designed for pulling a trailer vehicle (non-showed). The truck comprises for example a pair of steering wheels 2 and two pairs of load carrying rear wheels 3, of which at least one pair is traction wheels 3. The truck further comprises a driver's cabin 4 and rear trailer receiving portion 5. The trailer may be connected to the truck by means of a trailer coupling 6. The driver's cabin 4 comprises a door 7, a steering wheel 8 and a dashboard 9. A driver 10 for driving the truck may be located within the driver's cabin. The inventive vehicle driver feedback system and method for providing a vehicle driver feedback are herein described mainly applied to a truck, such as the truck shown in FIG. 1, but the invention is not limited to only trucks and may be equally well be implemented in other types of vehicles, such as automobiles, cars, busses, construction vehicles, motorbikes, rail vehicles, and the like. The invention is also not limited to vehicles having combustion engines and may equally well be implemented in hybrid electric vehicles and pure electric vehicles.

Figure 2:
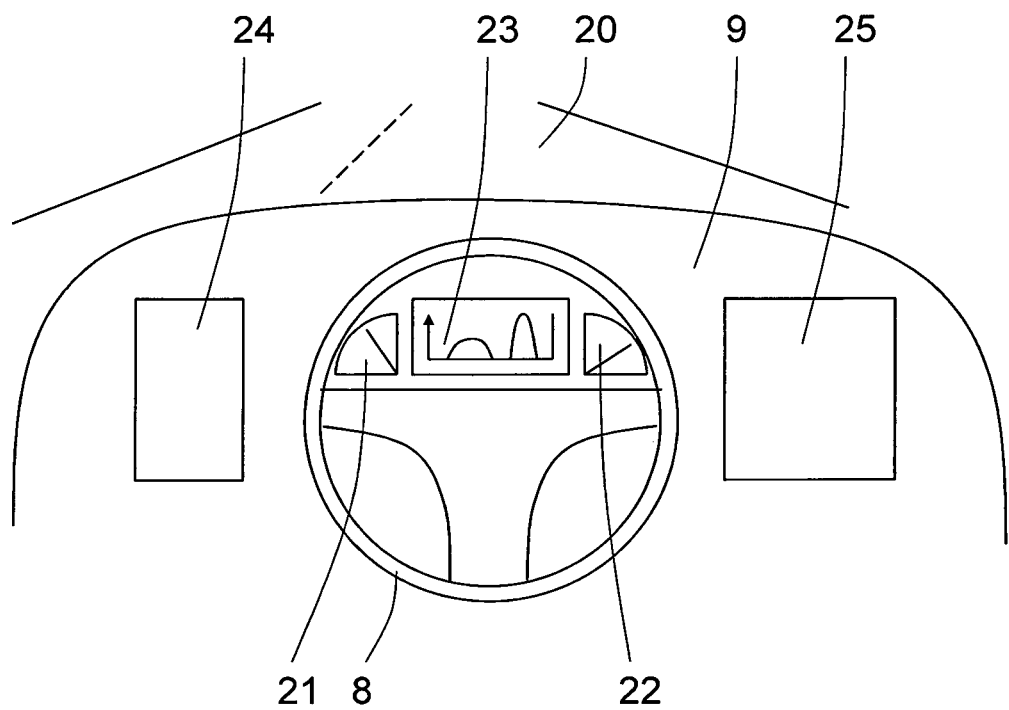
FIG. 2 shows a vehicle dashboard of the vehicle of FIG. 1.

FIG. 2 shows very schematically an exemplary forward view through a front window of the driver's cabin on the road 20 ahead of the vehicle 1 from a driver's perspective. The driver can also see the vehicle dashboard 9, the steering wheel 8 and an instrument panel comprising three displayed objects: An engine speed meter 21, a vehicle speed meter 22 and driver feedback display unit 23 of a driver feedback system. Left and right control panels 24, 25 are also provided in the dashboard as well-known in the art. The display unit 23 is preferably located clearly visible to the driver close to line of sight towards the road segment 20 ahead of the vehicle 1, such that the driver 10 can easily and quickly view the display unit 23 to receive feedback on the recent driven time period or recent distance. The display unit 23 may however be located at another location on the dashboard 9, such as in the left or right control panel 24, 25, or somewhere else on the dashboard 9, or somewhere else within the driver's cabin 4.

Figure 3:
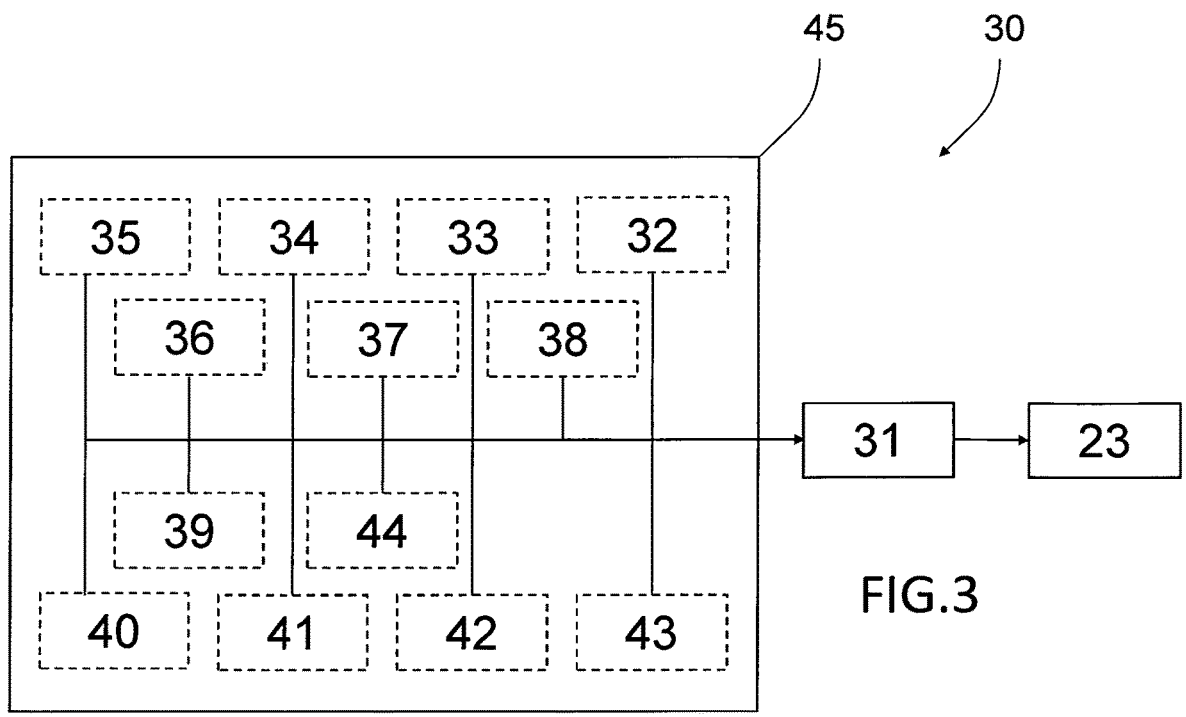
FIG. 3 shows a schematic overview of the feedback system.

FIG. 3 shows a schematic overview of the driver feedback system 30. The feedback system 30 comprises a control unit 31 and a display unit 23, The control unit 31 is arranged for registering a driver-influenced vehicle driving parameter and the display unit 23 is arranged for displaying information to the vehicle driver 10. The control unit 31 is further arranged for iteratively calculating and storing at least one score value SE, SF, SW, SU based on the at least one driver-influenced vehicle driving parameter, and displaying on the display unit 23 during driving of the vehicle 1 a graphical score value development over time or relative to the travelled route as feedback to the vehicle driver. The at least one score value SE, SF, SW, SU reflects a magnitude of any of a driver-induced energy waste; driver-induced fuel waste; driver-induced vehicle wear; unsafe driving; or a weighted combination of at least two thereof.

When the score value SE, SF reflects driver-induced energy waste or driver-induced fuel waste, then the score value may reflect the sum of one or more of waste of kinetic energy caused by vehicle braking, energy waste caused by increased vehicle drag resulting from driving faster than a speed threshold value, fuel waste during engine idling time, or decreased level of engine effectiveness at current engine operating state compared with a level of engine effectiveness at a more optimal engine operating state available for the present vehicle operating condition.

When the score value reflects waste of kinetic energy caused by vehicle braking, braking of the vehicle 1 is the driver-influenced vehicle driving parameter. Vehicle braking may in certain vehicles be realised by means of various types of braking devices. The control unit 31 may therefore advantageously be connected to various information sources 45 that can provide information to the control unit 31 about the vehicle braking status. For example, one information source may be an acceleration sensor 32 that is sensible to at least negative longitudinal acceleration, i.e. vehicle deceleration. The term longitudinal is herein defined as the driving direction of the vehicle 1. By reading the sensor output of the accelerator sensor 32 the control unit 31 can acquire and register the vehicle acceleration, which may be used as an indication of vehicle braking. Road inclination may be taken into account when determining vehicle braking based on longitudinal acceleration for avoiding any distortion incurred by road inclination. Road inclination may be acquired by an inclination sensor 41 located on the vehicle. The control unit 31 may advantageously be provided with information also from an engine control unit 33 concerning operation of an engine brake. Engine brake is usually realised by restricting the outlet flow of exhaust gas from the compression chambers of the combustion engine. Thereby, the vehicle can be decelerated as long as the crankshaft is rotationally connected to the driving wheels. The same applies to other types of non-friction based braking devices, such as hydraulic or electric retarders or electrical machines in hybrid electric vehicles, wherein the devices are rotationally connected to the powertrain and arranged to convert rotational energy into heat or electrical energy. In combination with any of the previously described input sources 32-33, or as an alternative thereto, the control unit 31 may advantageously receive input from any available friction based braking system. This may be realised for example by detecting the fluid pressure in the fluid operated braking system. The fluid may typically be a gaseous fluid such as pressurised air, or a liquid fluid such as a brake fluid. Alternatively, the actuation of a brake actuator such as a brake pedal may be monitored to establish when and with what degree the brake actuator is actuated. Still more alternatively, information about braking may be received from a braking control unit 34 and/or a cruise control unit 35 if available. Said control units 31, 33-35 may individual control units or merely functional units integrated into a single control unit, or a combination thereof. Based on the input from the friction based braking system an estimation of the deceleration can be calculated. Furthermore, vehicle braking may also be determined when the driver manually selects a relatively low gear that results in an engine speed above a threshold engine speed, such as for example 1500 rpm, without any torque demand. Upon determining that the vehicle is braking, the driver-induced energy waste may be iteratively calculated by comparing the vehicle speed before and after a certain time period, and calculating for each time period the energy loss corresponding to said loss in vehicle speed. The time period, which can be considered the inverse of the operating frequency of the control unit 31, may be selected according to the required feedback resolution, where a smaller time period such for example as 0.001-1 seconds provides a more sensible and dynamic feedback that can display also quick variations of the score value. Larger time periods such as for example about 1-10 seconds may be selected when there is less need for quick and dynamic feedback display. The score value reflecting driver-induced energy waste (Joule) may thus be calculated: $SE=\Sigma_0^t EBraking$, where t denotes the measuring time interval.

When the score value reflects energy waste caused by increased vehicle drag resulting from driving faster than a speed threshold value, vehicle speed is the driver-influenced vehicle driving parameter. Vehicle overspeeding may be determined by comparing current vehicle speed with a speed threshold value, which typically corresponds to the current upper speed limit. Current vehicle speed may be acquired by measuring the rotational speed of a vehicle wheel 2, 3, the engine or a transmission component using a speed sensor 36. Alternatively, or in combination, vehicle speed may be determined using a global positioning system (GPS) 37. Current upper speed limit is generally the speed limit set by a national authority for a specific road section, and which is displayed to the drivers by traffic signs. The traffic signs may be permanent or dynamic to adjust the upper speed limit according to the present condition, such as weather and/or traffic condition. The current upper speed limit may in addition to traffic signs be limited by a vehicle type specific speed limit, such as 80 km/h for heavy goods vehicles in many European countries. The control unit 31 may register the current upper speed limit by means of an electronic map 38 having the correct and updated upper speed limits for each road section and information from the GPS about the current vehicle position. Alternatively, or in combination, current vehicle upper speed limit may be acquired by an automatic traffic sign reading system 39 that detects and evaluates the traffic signs for continuously keeping the current upper speed limit updated. With information of both current vehicle speed and current upper speed limit, overspeeding is easily determined. The speed threshold value may optionally be set slightly larger than the current upper speed limit to enable certain flexibility in vehicle speed control without influencing the score value. Also, overspeeding can only be determined when torque is demanded by the driver, thereby avoiding that the driver receives negative feedback for overspeeding when rolling down a hill at a speed above the speed threshold value. When overspeeding is determined, the difference in drag (air resistance) between the current vehicle speed and the speed threshold value is calculated and used for calculating the driver-induced energy waste. The score value reflecting driver-induced energy waste may thus be calculated: $SE=\Sigma_0^t E_{Overacceleration}$, where t denotes the measuring time interval.

When the score value reflects decreased level of engine effectiveness at current engine operating state compared with a level of engine effectiveness at a more optimal engine operating state available for the present vehicle operating condition, overacceleration or the manual shifting pattern of the transmission are the driver-influenced vehicle driving parameters. Vehicle overacceleration may be determined by comparing current transmission shift pattern as received from a transmission control unit 40 with a predetermined shift pattern. With increased torque demand by the driver, e.g. increased depression of the acceleration pedal, the transmission control unit of the automatic transmission will enable the engine to reach higher engine speeds before initiating a gear change to a higher transmission ratio gear, because the engine can deliver more power at higher engine speeds. The transmission shift pattern consequently depends on the driver torque demand. A more modest driver torque demand enables the transmission control unit to initiate gear changes at lower engine speeds, thereby enabling a more fuel efficient driving of the vehicle. Operating the engine at lower engine speeds generally results in reduced fuel consumption. More specifically, the engine has operating ranges where the engine efficiency is higher than other operating ranges. Engine efficiency may here be determined in terms of power output in relation to fuel consumption. Consequently, operating the engine outside its high efficiency operating range results in increased fuel consumption. The predetermined shift pattern is thus selected to represent an engine operating range within the high efficiency range. By comparing the current transmission shift pattern with the predetermined shift pattern, over accelerating may be determined if one or more gear shifts are performed at higher engine speed than determined by the predetermined shift pattern. Alternatively, overacceleration may be determined by comparing current vehicle acceleration with a calculated upper acceleration limit. Current vehicle acceleration may be acquired by means of an acceleration sensor 32. The calculated upper acceleration limit may be determined based on a predetermined look-up table while taking into account variable factors such as primarily road inclination and cargo load. If the overacceleration results in operation of the engine in an operating mode having a reduced level of engine efficiency, then the reduced level of engine efficiency may be used for calculating the driver-induced energy waste. The score value reflecting driver-induced energy waste may thus be calculated: $SE=\Sigma_0^t E_{Overacceleration}$, where t denotes the measuring time interval.

As indicated above, the manual shifting pattern of the transmission may be the driver-influenced vehicle driving parameter. The automatic transmission comprises a transmission control unit that controls the gear changes. When the automatic transmission comprises a manual mode the driver can manually control the gear changing process. A manually controlled gear changing process generates a manual shifting pattern of the transmission. The control unit 31 may thus compare the manual shifting pattern of the transmission with a shifting pattern that the transmission control unit would have selected in case the transmission was operated in the automatic mode, taking into account the same internal and external circumstances and resulting vehicle acceleration and speed. If the manual shifting pattern differs from the preferred shifting pattern supplied by the transmission control unit, the reduced level of engine efficiency may be used for calculating the driver-induced energy waste. The score value reflecting driver-induced energy waste may thus be calculated: $SE = \Sigma_0{}^t E_{Shifting}$, where t denotes the measuring time interval.

When the score value reflects fuel waste during engine idling time, the driver-influenced vehicle driving parameter is combustion engine idling time. This parameter may be determined by identifying that the engine is operating in an engine idling mode and subsequently measuring the time period during which the engine is kept in the engine idling mode. Engine idling mode is an operating mode where there is no identifiable reason for keeping the engine idling, such that the idling merely appears to result in fuel waste. Operating the engine disconnected from the driving wheels for any useful reason is not necessarily considered as engine idling mode. Non-idling mode may for example be powering of an internal or external load, such as charging compressed air tanks, charging an electrical storage system in a hybrid electric vehicle, powering an external refrigerator unit of a cargo trailer, powering a fluid pump of a hydraulic system, or the like. Upon determining that the engine operates in an idling mode the current fuel consumption is used for calculating the driver-induced fuel waste caused while idling. The score value reflecting driver-induced energy waste may thus be calculated: $SV\_Energy = \Sigma_0{}^t E_{idling}$, where t denotes the measuring time interval and $E_{idling}$ is calculated based on the energy content of the combustion fuel and the general operating efficiency of the powertrain.

When the score value reflects the sum of a plurality of the above defined energy waste, the score value reflecting driver-induced energy waste SE may be calculated: $SE = E_0{}^t (E_{Braking} + E_{Overspeeding} + E_{Overacceleration} + E_{Shifting} + E_{idling})$ where t denotes the measuring time interval.

Unless the fuel waste is already known, for any one of the above defined driver-induced energy waste, a corresponding driver-induced fuel waste may be calculated by multiplying the energy waste multiplied with the energy content of the combustion fuel and dividing with a general operating efficiency of the powertrain.

When the score value SW reflects driver-induced vehicle wear, the score value may reflect the sum of one or more of level of lateral acceleration above a threshold value, level of longitudinal acceleration deceleration above a threshold value, level of wear of the vehicle friction brakes, level of wear on the chassis, and engine oil temperature.

When the score value reflects vehicle wear caused by excessive lateral acceleration, turning of the vehicle 1 is the driver-influenced vehicle driving parameter. Vehicle lateral acceleration corresponds to the vehicle acceleration in a direction perpendicular to the longitudinal direction. The lateral acceleration give raise to increased tire wear and may be may acquired by means of an acceleration sensor 42 installed to be sensitive to acceleration in the lateral direction. Alternatively, the output rate of a gyro 43 may be used to signify the level of angular acceleration of the vehicle. Still more alternatively, lateral acceleration may be estimated based on current vehicle speed and current vehicle steering angle. Excessive lateral acceleration is determined when the measured lateral acceleration exceeds a certain threshold value. The threshold value may be constant or dynamic taking into account additional parameters such as vehicle weight and/or lateral acceleration caused by uneven road conditions.

When the score value reflects vehicle wear caused by excessive longitudinal acceleration, braking and acceleration of the vehicle 1 are the driver-influenced vehicle driving parameters. Excessive vehicle longitudinal acceleration give raise to increased tire wear and may be may acquired by means of an acceleration sensor 42 installed to be sensitive to acceleration in the longitudinal direction. Alternatively, braking of the vehicle may be monitored and excessive wear may be determined when the longitudinal acceleration exceeds a threshold value. Braking may be monitored according to any of the methods described above. Still more alternatively, positive vehicle acceleration may be monitored and excessive tire wear may be determined when the longitudinal acceleration exceeds a certain threshold value. Positive acceleration may be monitored according to any of the methods described above. The positive or negative acceleration threshold value may be constant or dynamic taking into account additional parameters such as vehicle weight and/or longitudinal acceleration caused by road inclination.

When the score value reflects vehicle wear caused by level of wear of the vehicle friction brakes, braking of the vehicle 1 is the driver-influenced vehicle driving parameter. Vehicle braking may be monitored and determined according to various different methods as described in detail above. Only usage of the friction brakes should be considered upon determining vehicle wear incurred by braking.

When the score value reflects vehicle wear caused by excessive level of wear on the chassis, chassis motion is the driver-influenced vehicle driving parameter. Chassis motion, in particular in a vertical direction, may be monitored for example by monitoring suspension motion for at least one wheel, by monitoring the motion of any weight that is elastically mounted to the chassis such as driver's seat, engine block, etc. By monitoring the motion of at least one of said motions, an indication of the chassis motion relative the road can be acquired, in particular in the vertical direction. Generally, it is the amplitude of the motion that is the most relevant parameter of the motion because high amplitude, i.e. driving in bumpy conditions, indicates a high wear on the chassis. Low amplitude vibrations do generally not generate similar level of chassis wear. The level of vehicle lateral acceleration can also be taken into account because high lateral acceleration indicates elevated wear on the wheel bearings that are highly loaded during high lateral acceleration conditions. Excessive chassis wear is determined when the measured amplitude and/or lateral acceleration exceeds a certain threshold value. The threshold value may be constant or dynamic taking into account additional parameters such as vehicle weight and/or lateral acceleration caused by uneven road conditions.

When the score value reflects vehicle wear caused by high engine oil temperature, engine oil temperature is the driver-influenced vehicle driving parameter. Excessive engine oil temperature is caused by engine overloading, unless the oil cooling system is malfunctioning. High oil temperature can result in reduced lubrication properties of the lubrication oil, thereby resulting in increased vehicle wear. Excessive oil temperature is determined when the measured oil temperature exceeds a certain threshold value. The threshold value may be constant or dynamic taking into account additional parameters such as engine oil age.

When the score value reflects the sum of a plurality of the above defined vehicle wear, the score value reflecting driver-induced vehicle wear SW may be calculated: $SW\ E_0{}^t (W_{Braking} + W_{Tire} + W_{Chassi} + W_{oil})$, where t denotes the measuring time interval.

When the score value SU reflects driver-induced unsafe driving, the score value may reflect the sum of one or more of the level of lateral acceleration above a threshold value, the rate of change of vehicle longitudinal deceleration above a threshold value, the level of vehicle speed above the current vehicle speed limitation, the level of acceleration above a threshold value in residential areas, urban areas or in areas with low vehicle speed limitation, or the distance to the vehicle in front below a threshold value.

When the score value SU reflects unsafe driving caused by a lateral acceleration above a threshold value, turning of the vehicle 1 is the driver-influenced vehicle driving parameter. Excessive turning increases the risk for vehicle rollover, for loss of traction between the vehicle wheels and road surface, as well as generally involves more aggressive driving style, all of which can be considered a safety risk when exceeding a threshold value. The score value is preferably proportional to the level of lateral acceleration above the threshold value, or the like. Means for detecting lateral acceleration above a threshold value is described in detail above.

When the score value SU reflects unsafe driving caused by a rate of change of vehicle longitudinal deceleration above a threshold value, braking style is the driver-influenced vehicle driving parameter. A high rate of change of vehicle longitudinal deceleration is associated with a sudden relatively strong braking of the vehicle. This pose an immediate risk for the vehicles following the current vehicle overlook the sudden deceleration and crashes into the rear of the current vehicle. Furthermore, strong deceleration increases the risk for loss of traction between the vehicle wheels and road surface, as well as generally involves more aggressive driving style, both of which can be considered a safety risk when exceeding a threshold value. The score value is preferably proportional to the rate of change above the threshold value, or the like. Means for detecting longitudinal deceleration above a threshold value is described in detail above.

When the score value SU reflects unsafe driving caused by the level of acceleration above a threshold value in residential areas, urban areas or in areas with low vehicle speed limitation, driving style is the driver-influenced vehicle driving parameter. Residential areas, urban areas or in areas with low vehicle speed limitation are generally associated with a relatively large number of additional road users, pedestrians and children. Additional careful driving is therefore required in these areas. Vehicle acceleration above the threshold value in said areas is therefore generally considered involving a more aggressive driving style, such that an increased safety risk is incurred when exceeding a threshold value. The score value is preferably proportional to the level of acceleration above the threshold value, or the like. Means for detecting vehicle acceleration above a threshold value is described in detail above.

When the score value SU reflects unsafe driving caused by having a distance to the vehicle in front below a threshold value, driving style is the driver-influenced vehicle driving parameter. This driving parameter indicates a safety aspect of the current vehicle. The score value is preferably inversely proportional to the distance to the vehicle ahead below the threshold value, or the like. A sufficiently large distance is required to provide the driver with a certain reaction time and a certain braking distance upon an accident involving the vehicle in front. The distance must be increased with increased vehicle speed. A distance measuring sensor 44 may be provided, such as radar, laser or the like. Alternatively, an inter-vehicle communication system may be provided between front and rear vehicle in combination with accurate information of each vehicle position.

When the score value reflects the sum of a plurality of the above defined unsafe driving, the score value reflecting driver-induced unsafe driving SU may be calculated: $SU = \Sigma_0^t (S_{Overacceleration} + S_{Overspeeding} + S_{Hard\ braking} + S_{Aggressive\ drive\ style})$, where t denotes the measuring time interval. External parameters may be taken into account when determining the magnitude of the score value when reflecting unsafe driving. For example, poor visibility, low road traction conditions, poor road safety standard, heavy rainfall, dangerous cargo content, or the like may increase the magnitude of the displayed score value.

As mention above, the at least one score value may alternatively reflect a magnitude of a weighted combination of at least two of driver-induced energy waste, driver-induced fuel waste, driver-induced vehicle wear and driver-induced unsafe driving. A weighted combination of at least two score values reflecting different vehicle parameters has the advantage of enabling less sub optimization of the driving style with respect to the displayed score value, if a single score value is displayed. For example, a feedback system that only displays a score value reflecting driver-induced fuel waste may encourage a driver to adopt a driving style that is negative from a driving safety and vehicle wear perspective. For example, the driver is rewarded for avoiding braking of the vehicle even when the distance to the vehicle ahead is very small, and the driver is also rewarded for driving through curves with a relatively high vehicle speed, thereby generating both safety risks and elevated vehicle wear. A weighted combination of at least two score values may therefore provide feedback to the driver that does not encourage sub optimization with respect to the total driving behaviour. The weighting may be selected according to the desired driving style of the driver, such that the score value reflecting the most desired driving behaviour is weighed more than the score value reflecting less important driving behaviour. If all included score values are considered equally important the weighting may be split equally among the included score values. The actual weighting may also be constant or variable. A constant weighting is more easily implemented, whereas a variable weighting enables a more intelligent feedback that may take internal and external factors into account. For example, upon approaching a road curve driver-induced unsafe driving may be given a larger weight than driver-induced fuel waste for the purpose of temporarily reducing the negative feedback associated with vehicle braking, thereby improving driving safety.

As an alternative to a weighed combination of score values, or in combination therewith, two or more score values may be displayed simultaneously. The plurality of score values may be displayed by means of individual graphical score value representations provided more or less overlapping in the same graphical representation. Individual colours and/or graphical style may be used for improved distinction between the score values. Alternatively, the individual score values may be displayed in individual graphical charts that are placed next to each other. A single display unit 23 is preferably used for displaying all score values.

For each of the above defined score value SE, SF, SW, SU the current vehicle load level may additionally be taken into consideration. Thereby the energy waste may be defined in terms of Joule/load and the fuel waste in terms of load. A load neutral score value has the advantage of enabling simplified comparison of score value between different drivers and between different driving sessions of a single driver, since the load otherwise generally has a large impact on the score value. Evaluation of driving performance of a vehicle driver may be further enhanced by comparing accumulated score value SE, SF, SW, SU and/or average score value SE, SF, SW, SU with the result from other vehicle drivers or with results from previous driving sessions of the same driver. Individual score values, series of score values, accumulated score values, average score values, or otherwise processed information reflecting driver performance derived from the score values may be wireless transmitted to fleet management for further analysis, evaluation, benchmarking, comparison, etc. Accumulated score value SE, SF, SW, SU may be calculated over a certain time period, such as for example 5, 10, 30 or 60 minutes, or over a certain driving length, such as for example 5, 10, 50 or 100 kilometers. An accumulated score value is preferable also associated with a specific type of road standard such a high way or country road, road topography such a flat or hilly, and surroundings such as rural or urban. The score value may thus be associated with a specific geographical location and/or a specific type of road standard. An average score value SE, SF, SW, SU may be calculated by dividing an accumulated score value with a certain driving distance or time period.

The control unit 31 is arranged for iteratively calculating and storing the score value SE, SF, SW, SU. Each newly calculated score value is stored together with an individual index, time stamp, geographical location or the like for making each calculated score value retrievable for subsequent display, calculating an average or the like. A table or series of score values of the same type, such as a table or series of score values reflecting driver-induced energy waste SE, is thus made available, where each stored score value represents an individual time period or location, such that a score value development over time or score value development relative to the travelled route can be deduced by evaluating a plurality of consecutive score values. The set of score values is also used for displaying on the display unit 23 during driving of the vehicle 1 a graphical score value development over time as feedback to the vehicle driver 10. Alternatively, the score value development relative to the travelled mute is displayed as feedback to the vehicle driver 10. The score values are preferably stored in a memory unit accessible by the control unit 31. Alternatively, they may be temporarily stored in a memory associated with the display unit 23.

Figure 4:
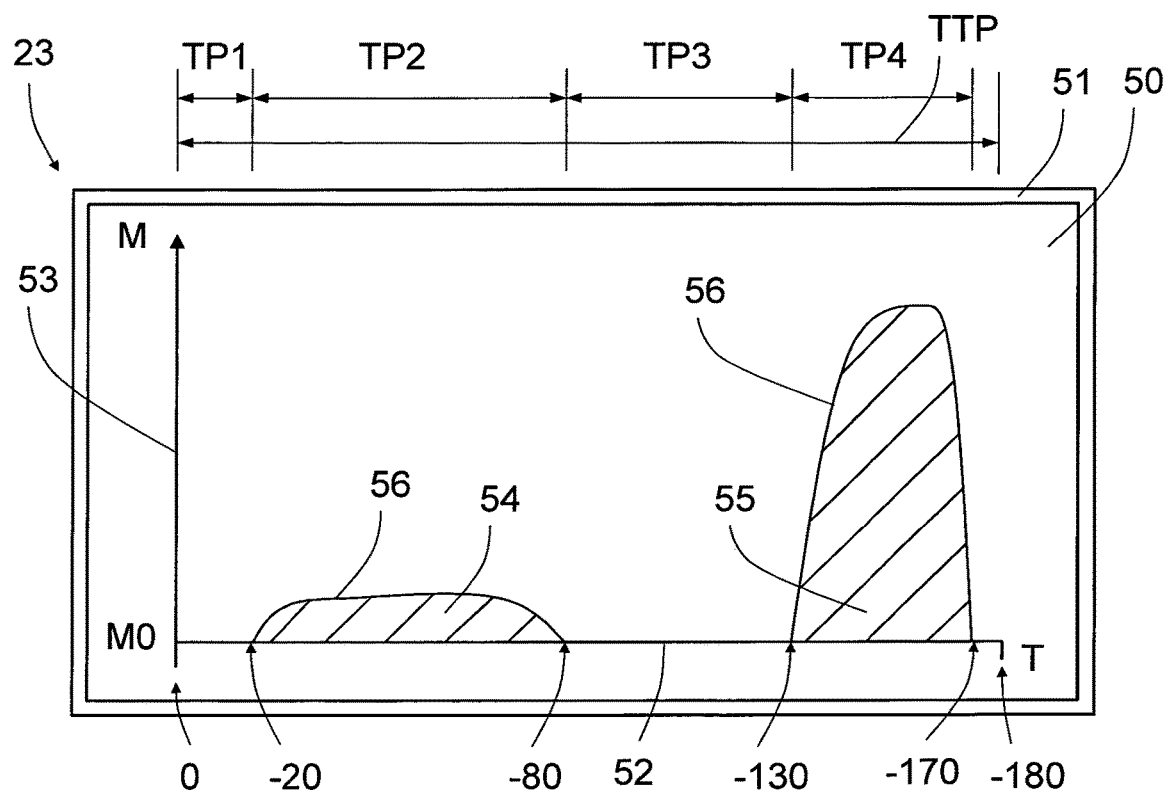
FIG. 4 shows an exemplary feedback on a display unit.
Figure 5:
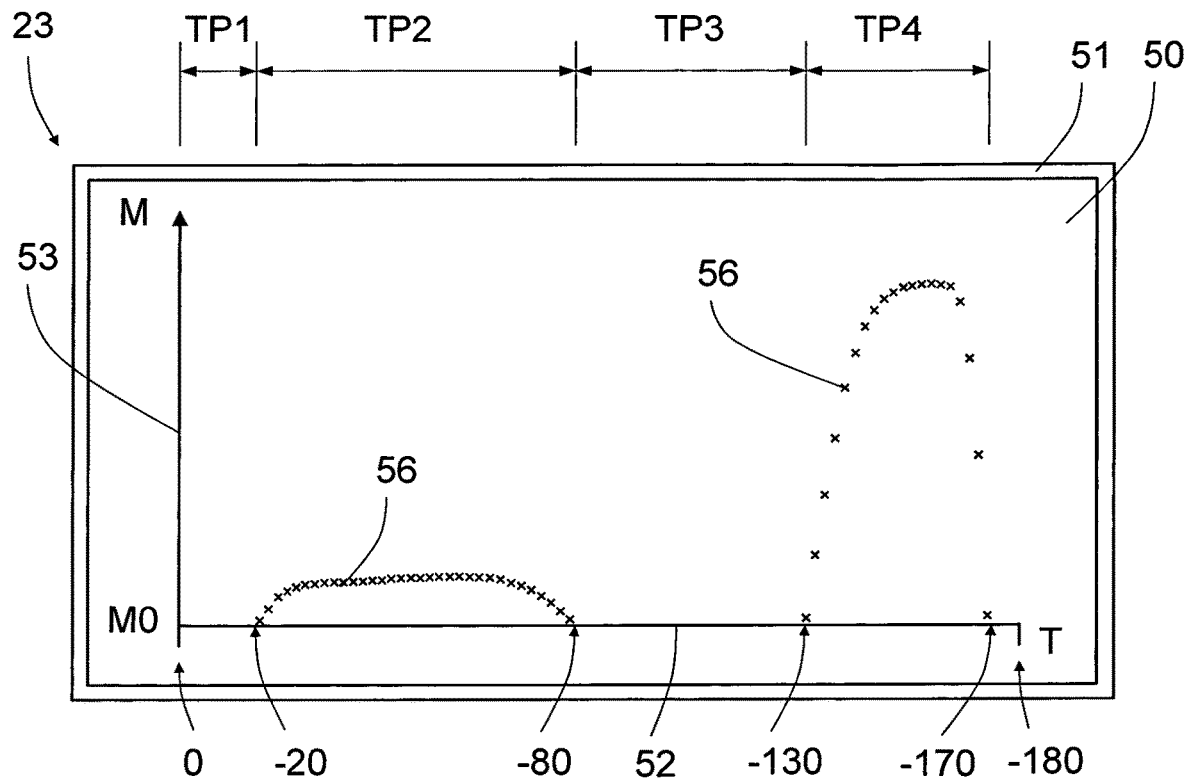
FIG. 5 shows the exemplary feedback of FIG. 4 bit with a different graphical representation.

FIG. 4 schematically illustrates an exemplary display unit 23 of graphical score value development over time as feedback to the vehicle driver 10. The score value may be any of the described types of score value, for example a score value reflecting fuel waste. The display unit 23 comprises a display panel 50 that is suitable for presenting information in visual form and may use any well-known conventional underlying technology for two-dimensional display of information, such as cathode ray tube display panel, light-emitting diode display panel, plasma display panel, liquid crystal display panel, thin-film transistor display panel, organic light-emitting diode display panel, or the like. The display panel may be surrounded by a frame 51. The feedback information should preferably be presented as close to the driver action as possible. The most recently calculated score value is therefore preferably calculated and displayed substantially in real-time, such that the vehicle driver get access to substantially instant feedback of how driver actions influence the score value development. Substantially instant means herein within less than about 1 second. The feedback information should preferably also visualise in a self-instructing manner the magnitude or impact a specific driving action or event had on the score value. The exemplary graphical display of FIG. 4 is believed to fulfil these criteria. A horizontal axis 52 depicts a timeline T with time point 0 represents the most recent time point and time point −180 that represents a time point about 180 seconds before the most recent time point, i.e. an about 180 seconds old time point. The display unit further displays a vertical axis 53 representing the magnitude M of the score value, where the intersection of the vertical and horizontal axes M, T represents zero score value, and increasing magnitude of the score value along the direction of the arrow of the vertical axis 53. During the most recent 20 seconds period TP1 from the current time point 0, the score value was zero. This time period TP1 could for example correspond to driving at constant speed on a flat road in the automatic transmission mode and without braking or overspeeding. A first score value section 54 is displayed between time points −20 and −80, i.e. a 60 seconds long time period TP2 having a score value above zero. The fuel waste caused by a driver action during this time period TP2, which ended 20 seconds ago, might for example be caused by a time period of vehicle still stand having the engine in an idling mode, as for example incurred in a traffic jam situation. During the time period TP3 between −80 and −130 the score value was zero, for example caused by rolling towards stand still without braking. The feedback system may be designed to disregard any braking of the vehicle in vehicle speed below a certain speed limit, for example 30 km/h, for avoiding inducing a dangerous driving style. Braking at relatively low speeds should always be allowable without inducing any negative feedback. That may be the reason why there is no score value above zero at the end of the rolling phase in this time period TP3. A second score value section 55 is displayed between time points −130 and −170, i.e. a 40 seconds long time period TP4 having a relatively high score value magnitude above zero. The fuel waste caused by a driver action during this time period TP4 might for example be caused by a time period of continuous braking of the vehicle, as for example incurred upon approaching a traffic jam situation on a high way. The vehicle then has to slow down from about 80 km/h to close to still stand. The driver briefly looking at the display unit 23 will understand that the braking phase TP4 during the second score value section 55 has a big negative impact on the fuel economy and the idling time TP2 was also negative but not to the same extent. The feedback system thus more or less instantly shows the amount of fuel waste in fuel per unit of time caused by the driver's actions. The graphical score value development over time is in FIG. 4 displayed as a continuous graph 56 having the section 54, 55 enclosed the continuous graph 56 and horizontal axis t hatched to clearly visualise the magnitude and time extension of the score value, but various other forms are possible, such as for example a discrete graph, a histogram, a bar chart, a pie chart or a scatter plot. For example, FIG. 5 shows the score value development of FIG. 4 but in form of a scatter plot. In case the score value is visualised by discrete steps, as on FIG. 5, the time period for calculating each the score value may be set to correspond to the time period between each displayed score value sample, such as about for example about 0.5–3 seconds. Alternatively, when the time period corresponding to each individually calculated score value is shorter, i.e. when there are more score values calculated than is desirable to be discretely displayed, an average of a certain number of consecutive score value calculations can be calculated and displayed as an individual discrete score value.

The total displayed time period TTP of the score value development over time may be selected according to the requirement of the specific implementation and may for example lie in the range of 0.1-60 minutes, preferably 0.2-10 minutes, and more preferably 0.5-5 minutes. In the example of FIG. 4 and FIG. 5 the total displayed tome period is 180 seconds. The total displayed time period TTP may be automatically controlled depending on the route condition, driving style, vehicle type, load condition, or the like. Alternatively, or in combination, the displayed range may be manually selected by means of a manual input device, such as a selector button.

Figure 6:
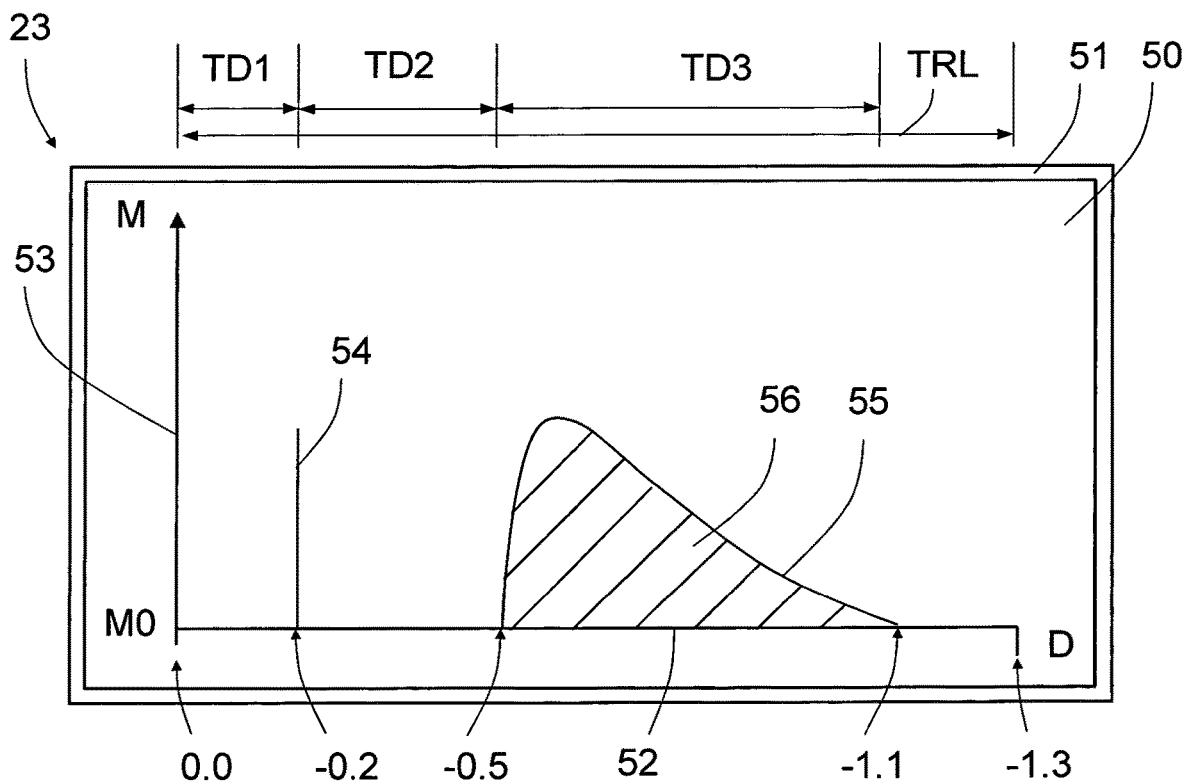
FIG. 6 shows an exemplary feedback having score value development relative to the travelled route.

FIG. 6 show still an alternative embodiment of the feedback system, wherein the score value development is displayed relative to the travelled route instead of over time. The horizontal axis 52 therefore defines a travelled distance D. In FIG. 6, the magnitude of the score value as feedback to the driver is here exemplary displayed for the most recent 1.3 kilometers. This score value feedback may reflect a similar driving situation as described in association with FIG. 4. The most recent 200 metres travelled distance TD1 may represent an acceleration phase without overacceleration. Before that an idling phase 54 at vehicle stillstand occurred at 200 metres before current position. During the travelled distance 200-500 metres before current position the vehicle may for example be decelerating during a rolling phase TD2 without braking, and during the travelled distance 100-500 metres before current position the vehicle may for example be braking from about 80-30 km/h during a braking phase TD3, where the score value SF waste reflecting a magnitude of fuel waste is displayed as a continuous graph 55. The illustrated total displayed route length TRL of 1.3 kilometers is only an example, and the score value may for example be displayed for a total route length TRL in the range of 0.1-80 kilometers, preferably 0.5-15 kilometer, and more preferably 1-5 kilometers. The total route length TRL may be automatically controlled depending on the route condition, driving style, vehicle type, load condition, or the like. Alternatively, or in combination, the total displayed route length TRL may be manually selected by means of a manual input device, such as a selector button.

Figure 7:
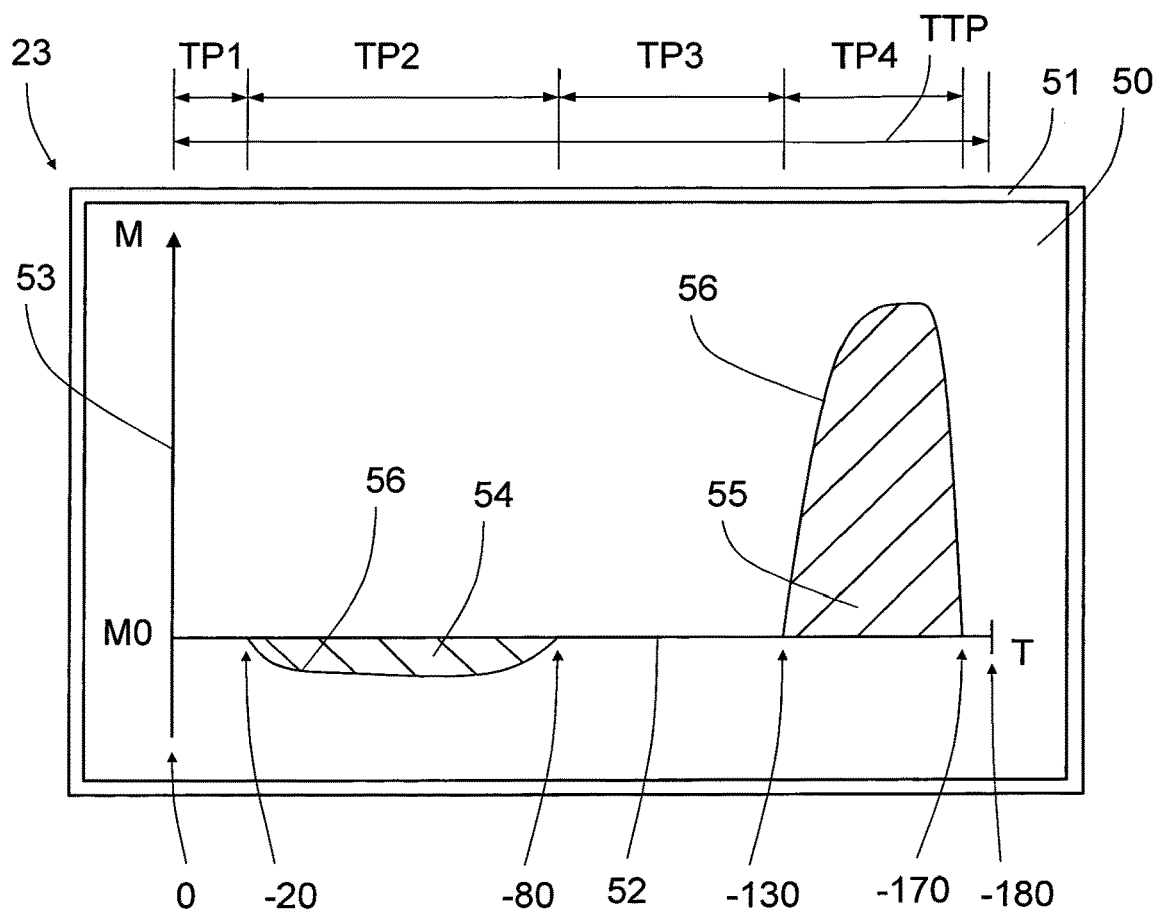
FIG. 7 shows a score value having positive feedback

The driver feedback system described above in connection with FIGS. 1-6 only shows negative feedback. That is fuel waste, energy waste, vehicle wear or unsafe driving. This feedback is important for making the driver aware of driving situations that possibly may be performed in a more fuel efficient, energy efficient, incurring less wear and safer manner. The feedback system may however additionally be provided with positive feedback for making the driver aware of driving situations that were actually performed well. The positive feedback may be visualised to the driver using the score value. This has the advantage of providing a single indicator that provides both positive and negative feedback. One possible solution is to visualise positive and negative feedback as a single score value having different polarity. Such as example is shown in FIG. 7, where negative feedback is shown on an upper side of the horizontal axis 52 and positive feedback is shown on the lower side of the horizontal axis 52. The location of the horizontal axis 52 is here slightly displaced towards a centre of the display panel 50 for enabling improved visualisation of both positive and negative score values. The location of the horizontal axis 52 is preferably fixed and selected according to the maximal magnitudes of the positive and negative score value that can be expected. The score value depicted in FIG. 7 corresponds to a driving situation similar to that shown in FIG. 4 but with the difference that the driver stopped the engine during the vehicle stillstand phase TP2. The score value here reflects both the magnitude of fuel waste and saved fuel. The magnitude of fuel waste during the braking phase TP4 is the same as in FIG. 4, but the time period TP2 shows a score value on the other side of the horizontal axis, thereby indicating a positive feedback caused by having the engine shut down during vehicle stillstand in traffic jam. The magnitude of the positive feedback may reflect en estimate of the actual improvement in terms of the score value that is reflected, or simply a predetermined value indicating a positive feedback. The score value may reflect a magnitude of driver-induced saved energy, driver-induced saved fuel, driver-induced low vehicle wear, or driver-induced safe driving. The score value SE, SF when reflecting driver-induced saved energy or driver-induced saved fuel may reflect saved energy or saved fuel by letting the vehicle roll. For example, a positive energy or fuel saving score value may be displayed when a driver selects to roll a certain distance immediately before arriving at a downhill road section to enable a certain speed increase caused by the energy conversion from potential energy to kinetic energy. Likewise, positive energy or fuel saving score value may be displayed when a driver selects to increase vehicle speed before climbing a hill to create a vehicle momentum, thereby resulting in improved fuel and energy efficiency. Positive energy or fuel saving score value may also be displayed when a driver selects to stop an engine instead of operating the engine in an idling mode, as shown in FIG. 7.

In FIG. 7, positive and negative feedback are visualised on different sides of the horizontal axis 52. The first and second score value sections 54, 56 may additionally be visualised with different type of hatchings, colourings, etc. to further enhance correct interpretation of the feedback. Positive feedback may for example be displayed as green score value sections and negative feedback may be displayed as red score value sections.

Figure 8:
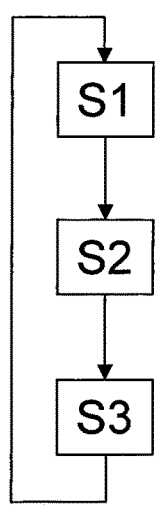
FIG. 8 shows a schematic flow chart.

The general method for providing vehicle driver feedback according to the invention will be described in connection with the flow chart of FIG. 8. The method comprises a first step S1 of acquiring information concerning at least one driver-influenced vehicle driving parameter. The actual parameter must thus be a parameter that the driver can directly or indirectly influence. For example, the driver may directly influence the actuating position of the accelerator pedal or brake pedal or the angular position of the steering wheel. The driver may also for example indirectly influence vehicle parameters such as engine operating efficiency, vehicle acceleration in all three directions XYZ. Suitable sensors may be provided to detect the relevant vehicle parameters, and other parameters, such as current engine torque, may be estimated and made available on a vehicle bus system, such as CAN bus. The first step S1 also involves registering selected driver-influenced vehicle driving parameters using a control unit 31. The selected driver-influenced vehicle driving parameters depends on the type of score value that should be displayed to the driver as feedback in the feedback system, as well as the desired degree of accuracy of that score value. For example, when designing a feedback system that is arranged to provide feedback in the level of fuel waste incurred by the driver, the score value SF may include merely fuel waste caused by driver-induced braking of the vehicle. Such a feedback system is relatively non-complex but does also not represent a particularly accurate feedback on all driver-induced parameters that affect the level of wasted fuel, such as engine idling, overacceleration, operating the engine outside the most efficient engine operating range, etc.

The method further comprises a second step S2 where the control unit iteratively calculates and stores at least one score value based on the at least one driver-influenced vehicle driving parameter. The score value is calculated to reflect a magnitude of driver-induced energy waste, driver-induced fuel waste, driver-induced vehicle wear, driver-induced unsafe driving, or a weighted combination of at least two thereof. The magnitude of the displayed score value may have a unit, such as amount of wasted fuel per travelled distance, or being unit less. The magnitude of a more subjective score value, such as level of driver-induced unsafe driving, can simply be calculated according to a set of rules where the most critical and serious unsafe driving events generates the highest magnitude and less critical and serious unsafe driving events generate less magnitude. Different parameters influencing unsafe driving may simply be summarized. When for example calculating the magnitude of a score value reflecting energy waste caused by driver-induced vehicle braking the current vehicle speed is registered by means of the control unit 31 and for example a vehicle speed sensor. This newly registered vehicle speed is compared with the most recent registered vehicle speed which was saved in the system. The time period between consecutive speed registrations may typically be about 0.01-1 second. If the newly registered speed is lower than the most recent registered speed stored in the memory, this is an indication that driver-induced braking has occurred. The difference is speed is determined and an energy waste is calculated based on this speed difference. Road inclination may be taken into account such that speed reduction caused by rolling uphill does not count as driver-induced braking. Furthermore, is must be determined that the loss of speed actually was induced by the driver. This may be realised by monitoring brake pedal position and the like. If it is confirmed that braking of the vehicle actually was induced by the driver then a score value reflecting the energy waste may be determined and stored in a memory. More or less immediately thereafter a new score value is calculated and stored. It is also investigated if a positive score value feedback is available. This may be realised by monitoring if the conditions governing the positive feedback are fulfilled. If yes, the resulting score value is displayed, which score value is defined by the summarized positive and negative feedback.

The method further comprises a second step S3 involving display of the relevant score value over the total displayed time period TTP or total displayed route length TRL. The total displayed time period TTP may for example be 3 minutes and the total displayed route length TRL may be 2 kilometers. Upon each iteration of the displayed score value it is updated with the most recently available information concerning the parameter reflected by the score value. Typically, the newest calculated score value is displayed in the graphical score value representation while the oldest score value was replaced. The total number of calculated score values are consequently generally constant. Since the newest score value is always displayed on the same location in the graphical representation, the entire score value representation will exhibit a relatively slow motion along the horizontal axis 52. The magnitude of an individual score value will thus remain constant after calculation, and the score value will appear to move slowly from one side to the other during display thereof. A large number of score values are generally necessary to provide the driver with useful information. After successful update of the display unit 23, the control unit 31 will be arranged to go back to the first step S1 again and to register new vehicle parameters.

As already discussed, the magnitude of any score value is based on at least one driver-influenced vehicle driving parameter. The actual relation between the magnitude of the score value and the detected driver-influenced vehicle driving parameter may however be selected freely according to the type of driving behaviour that is desired. The relation may for example be permanently determined in the vehicle software as delivered from the manufacturer. Alternatively, it may be designed according to the need and wishes of a buyer. The relation influences the level of positive and negative feedback for any driving action and may therefore be used for shaping the drivers of the vehicle according to a desired driving style. Vehicles of a first fleet manager may consequently be provided with different type of driving style feedback than vehicles of another fleet manager.

Figure 9:
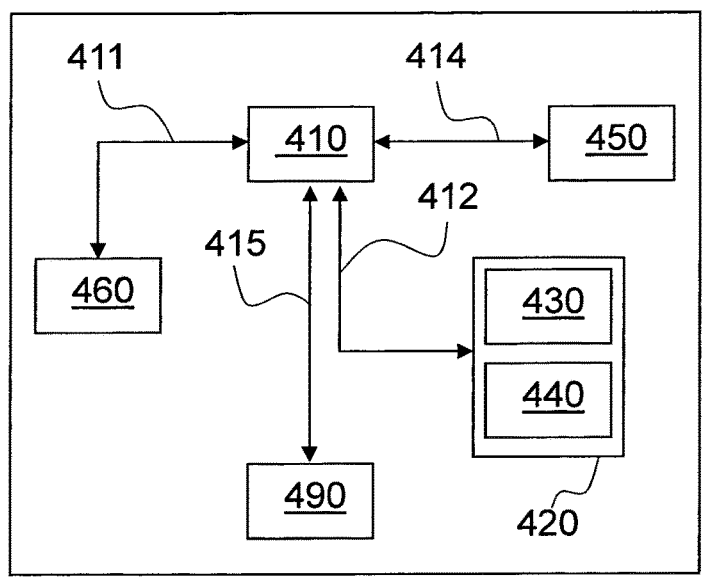
FIG. 9 shows schematically a control system for the feedback system.

The present invention also relates to a computer program, a computer readable medium carrying a computer program and a control unit for controlling a vehicle driver feedback system. FIG. 9 shows the invention applied on a computer arrangement. FIG. 9 shows an apparatus 400 according to one embodiment of the invention, comprising a non-volatile memory 42, a processor 410 and a read and write memory. The memory 420 has a first memory part 430, in which a computer program for controlling the apparatus 400 is stored. The computer program in the memory part 430 for controlling the apparatus 400 can be an operating system.

The apparatus 400 can enclose, for example, a control unit, such as a data-processing unit 410. The data-processing unit 410 can comprise, for example, a microcomputer. The memory 420 also has a second memory part 440, in which a program for providing vehicle driver feedback according to the disclosure is stored. In an alternative embodiment, the program for vehicle driver feedback is stored in a separate non-volatile storage medium 450 for data, such as, for example, a CD or an exchangeable semiconductor memory. The program can be stored in an executable form or in a compressed state. When it is stated below that the data-processing unit 410 runs a specific function, it should be clear that the data-processing unit 410 is running a specific part of the program stored in the memory 440 or a specific part of the program stored in the non-volatile storage medium 450.

The data-processing unit 410 is tailored for communication with the storage memory 450 through a data bus 414. The data-processing unit 410 is also tailored for communication with the memory 420 through a data bus 412. In addition, the data-processing unit 410 is tailored for communication with the memory through a data bus 411. The data-processing unit 410 is also tailored for communication with a data port 490 by the use of a data bus 415. The method according to the present invention can be executed by the data-processing unit 410, by the data-processing unit 410 running the program stored in the memory 440 or the program stored in the non-volatile storage medium 450.

It is to be understood that the present invention is not limited to the embodiments described above and illustrated in the drawings; rather, the skilled person will recognize that many changes and modifications may be made within the scope of the appended claims.

The invention claimed is:

1. A vehicle driver feedback system comprising:
   a plurality of information sources comprising a global positioning system (GPS) and a distance measurement sensor;

a control unit connected to the plurality of information sources; and a display unit connected to the control unit, the control unit being arranged for registering from the plurality of information sources a plurality of driver-induced vehicle driving parameters, the display unit being positioned in a vehicle and arranged for displaying information to the vehicle driver, and the control unit further being arranged for:
- iteratively calculating and storing an accumulated score value based on the driver-induced vehicle driving parameters, wherein the accumulated score value comprises a weighted combination of at least a first score value reflecting unsafe driving, a second score value reflecting driver-induced energy waste, a third score value reflecting driver-induced fuel waste, and a fourth score value reflecting driver-induced vehicle wear; and
- displaying on the display unit during driving of the vehicle a score value development over time as feedback to the vehicle driver, wherein the score value development comprises a comparison of the accumulated score value with a plurality of accumulated score values from previous driving sessions, wherein the first score value reflecting unsafe driving comprises a distance to a vehicle in front and further comprises at least one of:

a level of vehicle lateral acceleration above a first threshold value;

a rate of change of vehicle longitudinal deceleration above a second threshold value;

a level of vehicle speed above a current vehicle speed limitation;

a level of vehicle acceleration above a third threshold value in at least one of residential areas, urban areas, and areas with a low vehicle speed limitation.

2. The system according to claim 1, wherein a delay time between a driver action influencing the accumulated score value and display of a result of that driver action is less than 5 minutes.

3. The system according to claim 1, wherein the driver-induced vehicle driving parameters further comprise at least one of vehicle braking, combustion engine idling time, and manual shifting pattern.

4. The system according to claim 1, wherein the second score value reflecting driver-induced energy waste comprises at least two of:

a wasted amount of kinetic energy caused by vehicle braking;

a wasted amount of energy caused by increased vehicle drag resulting from driving faster than a speed threshold value;

a wasted amount of fuel during engine idling time; and a decreased level of engine effectiveness at current engine operating state compared with a level of engine effectiveness at a more optimal engine operating state available for a present vehicle operating condition.

5. The system according to claim 1, wherein the third score value reflecting driver-induced fuel waste comprises at least one of:

an amount of fuel saved by letting the vehicle roll; and an amount of fuel saved by increasing vehicle speed before climbing a hill.

6. The system according to claim 1, wherein the fourth score value reflecting driver-induced vehicle wear comprises at least two of:

the level of lateral acceleration above the first threshold value;

a level of longitudinal acceleration above a fourth threshold value; and a level of wear of vehicle friction brakes.

7. The system according to claim 1, wherein the accumulated score value is calculated by also taking into account a current vehicle load level.

8. The system according to claim 1, the control unit being further arranged for calculating the accumulated score value over a certain time period, and calculating an average score value by dividing the accumulated score value with a certain distance.

9. The system according to claim 8, the control unit being further arranged for evaluating a driving performance of the vehicle driver by comparing at least one of the accumulated score value and the average score value with results from other vehicle drivers.

10. The system according to claim 1, wherein the score value development is graphically displayed as a continuous graph, discrete graph, histogram, bar chart, pie chart or scatter plot.

11. The system according to claim 1, wherein the accumulated score value is calculated and displayed substantially in real-time, such that the vehicle driver has access to substantially instant feedback of how driver actions influence the accumulated score value.

12. A vehicle comprising a vehicle driver feedback system according to claim 1.

13. A method for providing vehicle driver feedback comprising:

registering a plurality of driver-induced vehicle driving parameters from a plurality of information sources, the plurality of information sources comprising a global positioning system (GPS) and a distance measurement sensor;

iteratively calculating and storing an accumulated score value based on the driver-induced vehicle driving parameters, wherein the accumulated score value comprises a weighted combination of at least a first score value reflecting unsafe driving, a second score value reflecting driver-induced energy waste, a third score value reflecting driver-induced fuel waste, and a fourth score value reflecting driver-induced vehicle wear; and displaying during driving of the vehicle a score value development over time as feedback to the vehicle driver, wherein the score value development comprises a comparison of the accumulated score value with a plurality of accumulated score values from previous driving sessions, wherein the first score value reflecting unsafe driving comprises a distance to a vehicle in front and further comprises at least one of:

a level of vehicle lateral acceleration above a first threshold value;

a rate of change of vehicle longitudinal deceleration above a second threshold value;

a level of vehicle speed above a current vehicle speed limitation;

a level of vehicle acceleration above a third threshold value in at least one of residential areas, urban areas, and areas with a low vehicle speed limitation.

14. The method according to claim 13, wherein a delay time between a driver action influencing the accumulated score value and display of a result of that driver action is less than 5 minutes.

15. The method according to claim 13, wherein the driver-induced vehicle driving parameters further comprise at least one of vehicle braking, combustion engine idling time, And manual shifting pattern.

16. The method according to claim 13, wherein the second score value reflecting driver-induced energy waste comprises at least two of:
- a wasted amount of kinetic energy caused by vehicle braking;
- a wasted amount of energy caused by increased vehicle drag resulting from driving faster than a speed threshold value;
- a wasted amount of fuel during engine idling time; and
- a decreased level of engine effectiveness at current engine operating state compared with a level of engine effectiveness at a more optimal engine operating state available for a present vehicle operating condition.

17. The method according to claim 13, wherein the third score value reflecting driver-induced fuel waste comprises at least one of:
- an amount of fuel saved by letting the vehicle roll; and
- an amount of fuel saved by increasing vehicle speed before climbing a hill.

18. The method according to claim 13, wherein the fourth score value reflecting driver-induced vehicle wear comprises at least two of:
- the level of lateral acceleration above the first threshold value;
- a level of longitudinal acceleration above a fourth threshold value; and
- a level of wear of vehicle friction brakes.

19. The method according to claim 13, comprising calculating the accumulated score value by also taking into account a current vehicle load level.

20. The method according to claim 13, further comprising calculating the accumulated score value over a certain time period, and calculating an average score value by dividing the accumulated score value with a certain distance.

21. The method according to claim 20, comprising evaluating a driving performance of the vehicle driver by comparing at least one of the accumulated score value and the average score value with results from other vehicle drivers.

22. The method according to claim 13, wherein the score development is graphically displayed as a continuous graph, discrete graph, histogram, bar chart, pie chart or scatter plot.

23. The method according to claim 13, comprising calculating and displaying the accumulated score value substantially in real-time, such that the vehicle driver has access to substantially instant feedback of how driver actions influence the accumulated score value.

24. A computer comprising a program for performing the method of claim 13 when the program is run on the computer.

25. A non-transitory computer readable medium carrying a computer program for performing the method of claim 13 when the computer program is run on a computer.

26. A control unit for providing vehicle driver feedback, the control unit being configured to:
- register a plurality of driver-induced vehicle driving parameters from a plurality of information sources connected to the control unit, the plurality of information sources comprising a global positioning system (GPS) and a distance measurement sensor;
- iteratively calculate and store an accumulated score value based on the driver-induced vehicle driving parameters wherein the accumulated score value comprises a weighted combination of at least a first score value reflecting unsafe driving, a second score value reflecting driver-induced energy waste, a third score value reflecting driver-induced fuel waste, and a fourth score value reflecting driver-induced vehicle wear; and
- display via a display unit connected to the control unit during driving of the vehicle a score value development over time as feedback to the vehicle driver, wherein the score value development comprises a comparison of the accumulated score value with a plurality of accumulated score values from previous driving sessions,
- wherein the first score value reflecting unsafe driving comprises a distance to a vehicle in front and further comprises at least one of:
- a level of vehicle lateral acceleration above a first threshold value;
- a rate of change of vehicle longitudinal deceleration above a second threshold value;
- a level of vehicle speed above a current vehicle speed limitation,
- a level of vehicle acceleration above a third threshold value in at least one of residential areas, urban areas, and areas with a low vehicle speed limitation.

* * * * *